Figure 1:
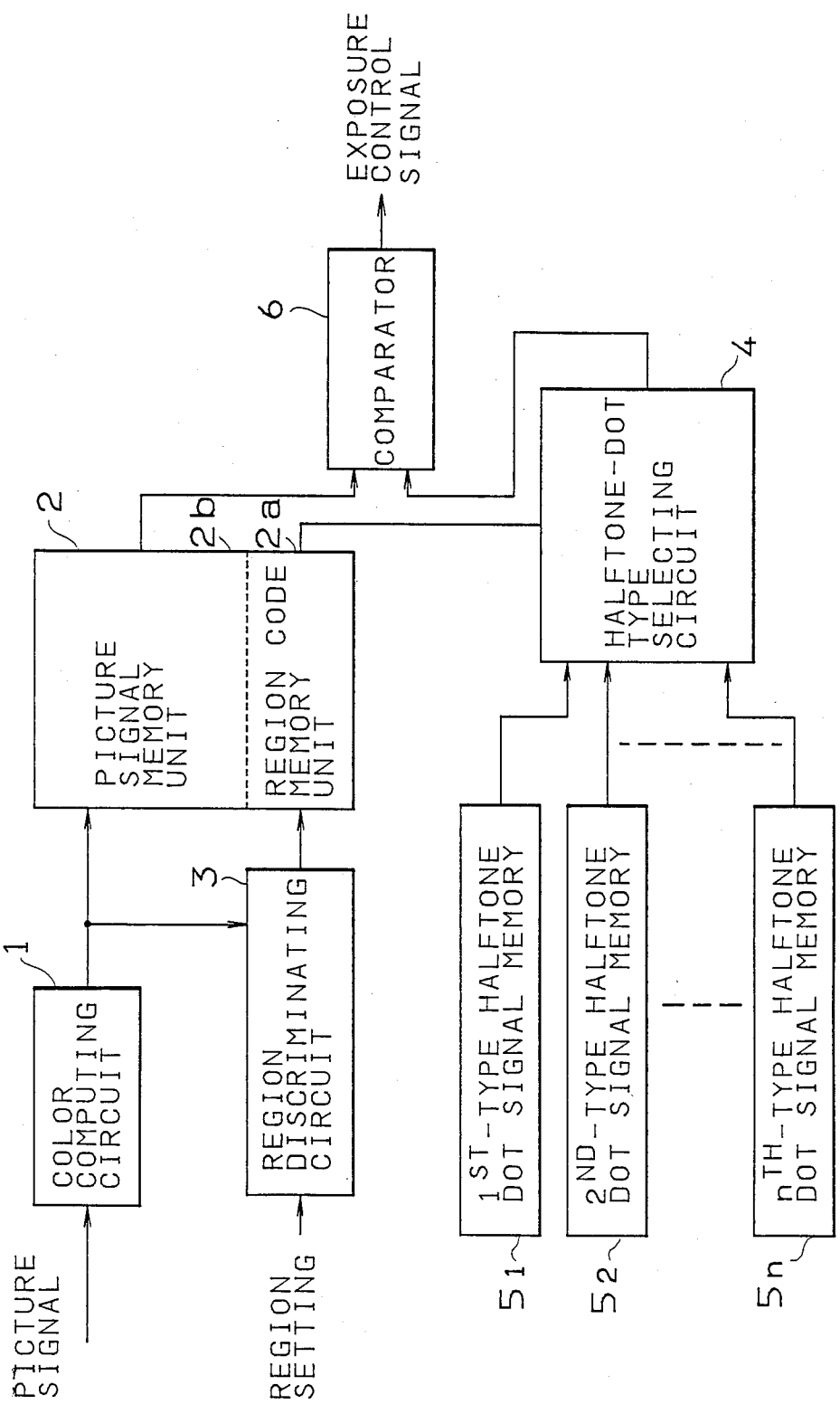

United States Patent [19]

Miwa

[11] Patent Number: 4,727,430
[45] Date of Patent: Feb. 23, 1988

[54] HALFTONE IMAGE RECORDING METHOD AND APPARATUS THEREFOR

[75] Inventor: Mamoru Miwa, Ibaragi, Japan

[73] Assignee: Dainippon Screen Mfg. Co., Ltd., Kyoto, Japan

[21] Appl. No.: 854,872

[22] Filed: Apr. 23, 1986

[30] Foreign Application Priority Data

Jun. 12, 1985 [JP] Japan .................. 60-126179

[51] Int. Cl.[4] ............................................. H04N 1/40
[52] U.S. Cl. ................................. 358/283; 358/298; 358/80
[58] Field of Search .................. 358/283, 280, 298, 80

[56] References Cited

U.S. PATENT DOCUMENTS 4,547,811 10/1985 Ochi et al. ........................... 358/283

Primary Examiner—Edward L. Coles, Sr.
Attorney, Agent, or Firm—Zarley, McKee, Thomte, Voorhees & Sease

[57] ABSTRACT

A halftone image is reproduced and recorded by photoelectrically scanning an original in the following manner. One of the density range, hue range and coordinate range of the original or an image, which has been obtained by modifying the original as desired, is divided into a suitable number of regions having a prescribed width. One of plural kinds of halftone signals of different halftone shapes is then selected for each of the thus-divided regions in accordance with a region signal corresponding to the same divided region, whereby a halftone image containing plural kinds of dot shapes is recorded. An apparatus for practicing the above method is also described.

5 Claims, 3 Drawing Figures

HALFTONE IMAGE RECORDING METHOD AND APPARATUS THEREFOR

This invention relates to an electronic color-scanning technique for electronically effecting the halftone photography upon making printing plates. The term "halftone dot or dots" as used herein means collectively not only halftone dot or dots in a narrow or limited sense (namely, usual halftone dot or dots) but also all fine elements of various types which can be used to make up halftone images.

It has conventionally been well-known that a picture or mark on a printed matter may be rendered more attractive in expression by choosing and using halftone dots of a proper type. For this reason, as contact screens for photographic plate making processes, contact screens bearing halftone dots of various shapes are provided, e.g., two-size halftone dot screens, grained screens, horizontal hatching screens, vertical hatching screens, brick screens and the like besides usual halftone dot screens. They are selectively used in accordance with the types of pictures and/or marks in originals.

Reflecting the recent diversification in expression of pictures and/or marks in printed matter, it is in some instances required to effect halftone photography by means of a plurality of halftone dot shapes in a single sheet of printed matter. If one relies upon a photographic plate making process to meet the above-mentioned demand, it will be necessary not only to proceed with increased plate-making steps but also to use negative and positive masks of high accuracy. Moreover, the masking operation takes lots of time and has to be carried out manually by a skilled worker.

In electronic color-scanning techniques making use of color scanners or the like on the other hand, electronic color-scanning apparatus equipped with recording units, which are generally called "dot generators", have found wide-spread commercial utility to effect halftone photography electronically for direct recording of halftone images (see, for example, Japanese Patent Laid-Open No. 21131/1972 and Japanese Patent Laid-Open No. 80639/1983).

Since the picture scanning and recording system of a conventional dot generator is designed to generate only one type of dot shape in each scanning, multiple exposure in which two or more scanning operations are carried out is needed in order to expose areas of different dot shapes separately.

It is necessary to go through with cumbersome mask-making and multiple exposure steps in both halftone photographic plate-making technique and electronic halftone plate-making, i.e., color-scanning technique. Lots of time is accordingly required for making printing plates, leading to an increased manufacturing cost.

With the foregoing in view, the present invention has as its objects the provision of a method for automatically applying halftone photography with desired dot shapes to one or more prescribed areas by scanning only once with a color scanner, which records a halftone image by a dot generator, so as to allow halftone dots of different kinds to exist in combination in the one or more specific areas or in the entire area or to record areas of a particular color hue selectively with a different dot shape, thereby obtaining a printed matter containing plural kinds of dot expressions, which is similar to those obtained by conventional techniques, promptly at a lower cost as well as the provision of an apparatus for practicing the above-described process.

In one aspect of this invention, there is thus provided a method for reproducing and recording a halftone image by photoelectrically scanning an original, which comprises dividing one of the density range, hue range and coordinate range of the original or an image, which has been obtained by modifying the original as desired, into a suitable number of regions having a prescribed width, and selecting one of plural kinds of halftone signals of different halftone shapes for each of the thus-divided regions in accordance with a region signal corresponding to the same divided region, whereby a halftone image containing plural kinds of dot shapes is recorded.

In another aspect of this invention, there is also provided an apparatus for reproducing and recording a halftone image by photoelectrically scanning an original, which comprises:

means for dividing one of the density range, hue range and coordinate range of the original or an image, which has been obtained by modifying the original as desired, with a prescribed width and outputting region signals corresponding to the thus-divided regions;

means for selecting one of plural kinds of halftone signals of different halftone shapes for each of the thus-divided regions in accordance with a region signal output corresponding to the same divided region from the region dividing means;

means for generating the plural kinds of halftone signals of the different halftone shapes; and signal comparator means for comparing an image signal corresponding to the region of the region signal and the halftone signal selected in accordance with the region signal and outputting an image signal for recording a reproduced image.

According to the present invention, one of the density range, hue range and coordinate range of an original to be produced or an image, which has been obtained by modifying the original as desired, is divided with a suitable width into a suitable number of regions. A halftone image is then recorded in such a way that one or more pictures and/or marks in the same one of the thus-divided regions are recorded with the same dot shape and one or more pictures and/or marks in another divided region are recorded with a different dot shape. The present invention facilitates to contain plural kinds of dots in combination in a single sheet of printed matter. Owing to the inclusion of the region setting step, the overall operation can be performed in the same manner as in a conventional and usual halftone photographic operation making use of a single kind of dot shape. By allowing different kinds of dots to exist in combination in order to show a single piece of original, an image expression method hardly available from conventional printing techniques has now been provided no matter whether the image is a monocolor image or a color image.

Figure 2:
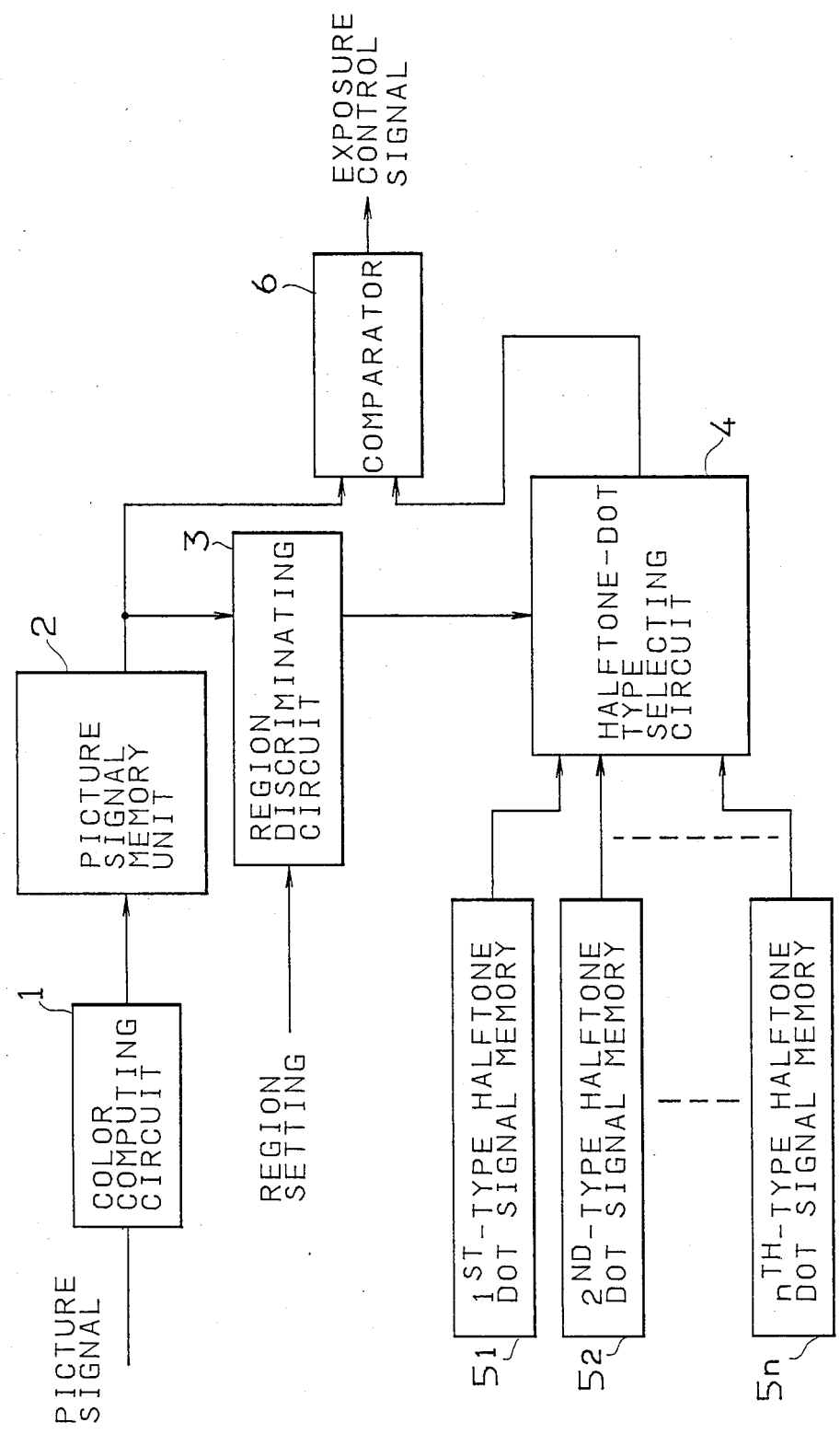
Figure 3:
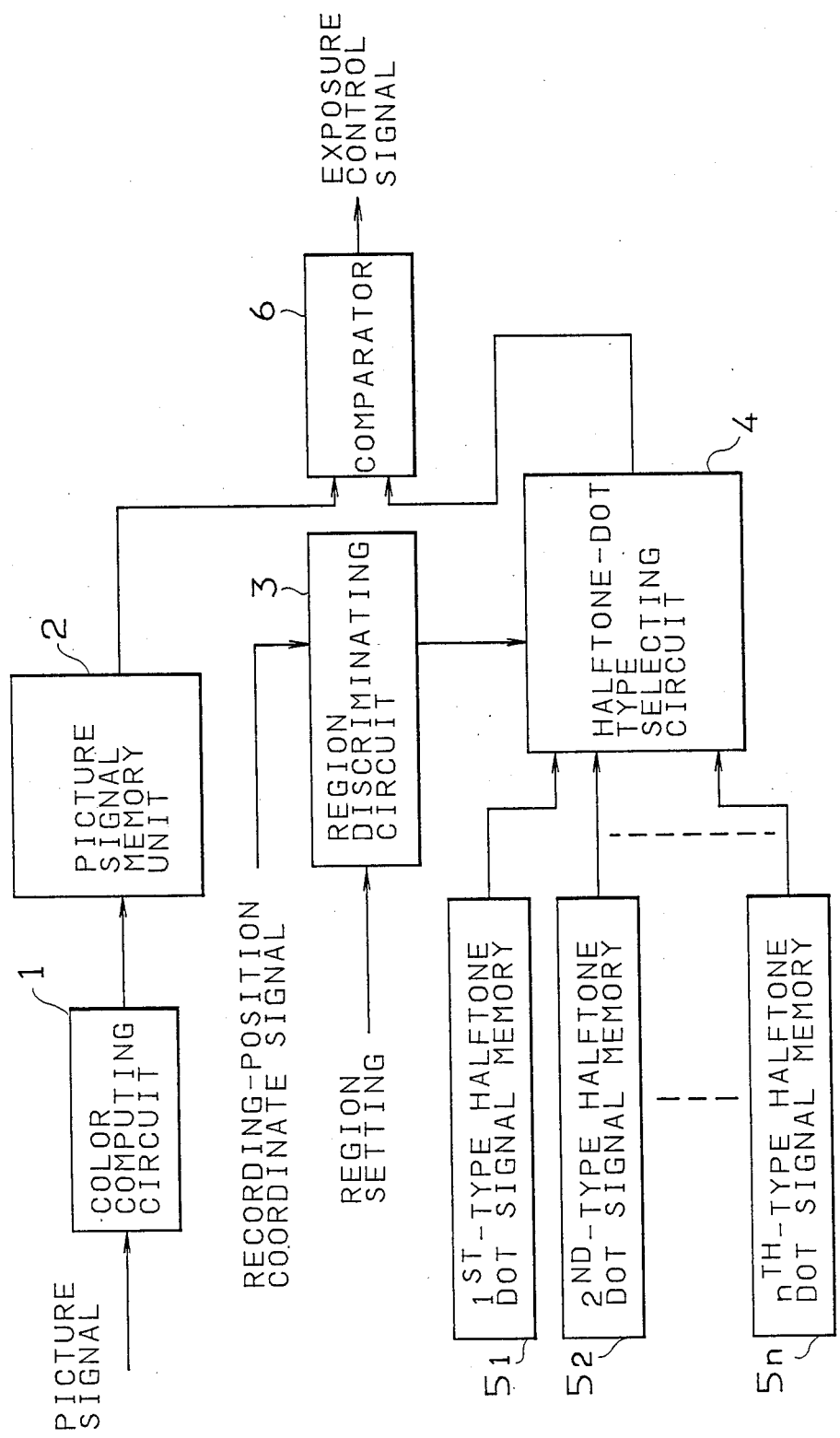

The above and other objects, features and advantages of the present invention will become apparent from the following description and the appended claims, taken in conjunction with the accompanying drawings, in which:

FIG. 1 is a block diagram of an exemplary dot-forming unit for a color scanner, showing means for dividing a density range or color hue range into regions, said means being provided before a buffer memory such as a magnification-changing buffer memory;

FIG. 2 is a block diagram of another illustrative dot-forming unit for a color scanner, showing means for dividing a color hue range, said means being provided immediately before the dot-forming diagram; and FIG. 3 is a block diagram of a further illustrative dot-forming unit for a color scanner, showing means for dividing a coordinate range, said means being provided immediately before the dot-forming unit.

In FIGS. 1 through 3, the present invention has been incorporated, as different embodiments, in a dot-forming unit (dot generator) of a color scanner which is adapted to perform electronic halftone photography.

In each of FIGS. 1 through 3, there are shown a color computing circuit 1, a memory unit 2, a region discriminating circuit 3, a halftone-dot type selecting circuit 4, halftone dot signal memories $5_1$ to $5_n$, a comparator 6 for the formation of dots.

The color computing circuit 1 is a known analog or digital circuit for performing various functions which a color scanner is usually equipped with, for example, color correction control, tusche plate formation and background color removal, detail emphasis, etc. The color computing circuit 1 outputs separated four-color signals, i.e., yellow (Y) signals, magenta (M) signals, cyan (C) signals and black (K) signals.

The memory 2 is a conventional buffer memory means employed for magnification change and simultaneous recording of the four, namely, Y, M, C and K color plates. Signals which are read out for recording a reproduced image are either one of the four types of color-separated signals, i.e., Y, M, C or K signals.

The region-discriminating circuit 3 serves to divide any one of the density range, color hue range and coordinate range of an image to be reproduced, to put region identification numbers respectively to the thus-divided regions, and to output region signals corresponding respectively to the divided regions.

The halftone-dot type selecting circuit 4 chooses, in accordance with each region signal, one of dot signals input respectively from the plural halftone. dot signal memories $5_1$–$5_n$ and then outputs the thus-chosen dot signal.

The halftone dot signal memories $5_1$–$5_n$ store halftone dot signals which are respectively employed to store different halftone dot shapes. The different halftone dot shapes are separately and suitably allotted to the halftone dot signal memories, for example, usual halftone dots to the first halftone dot signal memory $5_1$, grained halftone dots to the second halftone dot signal memory $5_2$, and brick halftone dots, two-size dots, horizontal hatching dots, oblique hatching dots and the like successively to the third halftone dot signal memory $5_3$ to the $n^{th}$ halftone dot signal memory $5_n$.

The dot-forming comparator 6 serves to convert the density levels of color signals of any one type, which have been output from the memory unit 2 to make the desired color plate, into a corresponding dot percent of a halftone dot shape, which is to be recorded, in accordance with halftone dot signals output from the halftone-dot type selecting circuit 4.

The three embodiments of the present invention will next be described with reference to their corresponding drawings.

When a magnification change (see, for example, Japanese Patent Publication No. 16972/1966, Japanese Patent Publication No. 26413/1977 and Japanese Patent Laid-Open No. 65601/1979) and simultaneous recording of four color plates (see Japanese Patent Publication No. 601/1977 for instance) are performed parallelly, a picture signal memory unit 2a and region signal memory unit 2b are provided with the memory unit 2 as shown in FIG. 1, whereby the four color-separated signals Y, M, C and K and region signals corresponding respectively to the color-separated signals are separately stored in combination in the same addresses.

The region discriminating circuit 3 of FIG. 1 divide either density range or color hue range (see, for example, Japanese Patent Publication No. 14845/1975) with a prescribed width in accordance with individual color-separated signals Y,M,C,K output from the color computing circuit 1.

When the density range is divided by way of example, the density range is expressed in terms of dot percent with respect to one of the color-separated signals Y,M,C,K and is divided, for example, into 3 regions which correspond to 0–40%, 40–70% and 70–100% respectively. Region identification numbers [1], [2] and [3] are then put to the thus-divided regions respectively.

In order to obtain dot shapes corresponding to individual regions, the region identification numbers are code-converted into region signals, which are employed to select corresponding halftone dot signals based on the kinds of halftone dots, with reference to a conversion table in accordance with the region identification numbers.

TABLE 1

| Image density | Dot combination | | |
|---|---|---|---|
| | (A) | (B) | (C) |
| 0–40% [1] | Usual dots [RS-1*] | Two-size dots [RS-4] | Horizontal hatching [RS-5] |
| 40–70% [2] | Grained [RS-2] | Horizontal hatching [RS-5] | Oblique hatching [RS-6] |
| 70–100% [3] | Brick [RS-3] | Grained [RS-2] | Vertical hatching [RS-7] |

Note:
In each of the combinations, the screen line number of dots may be either the same or different as desired.
*RS stands for "region signal".

Depending on the type of each original, one of the dot combinations (A), (B) and (C) is chosen as a combination of dot shapes in advance in the conversion table shown in Table 1.

When division is performed with respect to the color hue range, it is determined based on the color-separated three color signals Y,M,C to which suitably-divided color hue ranges the color hue regions containing in the color-separated three color signals Y,M,C correspond, thereby obtaining the region identification numbers allotted to the regions and then code-converting the region identification numbers into the codes of prescribed region signals, for example, RS-1, RS-2, RS-3, . . . shown in Table 1.

In order to determine in which one of the regions of the color hue range a color hue shown by the color-separated color signals Y,M,C falls, conventional color separation means is employed along with means for separating a specific color, the latter means having a specific width.

A color hue range is separated into yellow (Y), orange (O), magenta (M), violet (V), cyan (C) and green (G), for example, in accordance with outputs from a conventional color separation circuit (see Japanese Patent Publication No. 14845/1975 for instance).

Alternatively, a particular color in the background may only be divided by a specific circuit.

The entire color hue range is divided into a plural number of regions. It is optional to determine from which color to which color of the color hue be included in a single divided region. The color range can be suitably chosen depending on the type of each original to be reproduced.

An illustrative color hue division will next be shown in Table 2.

TABLE 2

| Color hue | Dot combination | | |
|---|---|---|---|
| | (A) | (B) | (C) |
| Y [1] | Usual dots [RS-1*] | Horizontal hatching [RS-5] | Brick [RS-3] |
| O [2] | Grained [RS-2] | Vertical hatching [RS-7] | Two-size dots [RS-4] |
| M [3] | Brick [RS-3] | Usual dots [RS-1] | Horizontal hatching [RS-5] |
| V [4] | Two-size dots [RS-4] | Grained [RS-7] | Vertical hatching [RS-4] |
| C [5] | Horizontal hatching [RS-5] | Brick [RS-3] | Usual dots [RS-1] |
| G [6] | Vertical hatching [RS-7] | Two-size dots [RS-4] | Grained [RS-2] |

Note:
In each of the combinations, the screen line number of dots may be either the same or different as desired.
*RS stands for "region signal".

The above-described region discrimination numbers may be output as region signals in the form of codes by which corresponding halftone dot signals can be chosen directly. It is however more desirable to permit free selection as to combinations of divided regions and halftone dot signals in accordance with a conversion table and hence to provide a wider expression method of halftone images, since depending on the type of each image, use of a different dot shape may permit more effective expression even in the same region.

Region signals output from the region discriminating circuit 3 in accordance the density range or color hue range of a desired kind of color-separated color signals Y, M, C or K are stored in one-to-one combination with the color-separated color signals Y, M, C or K, for example, at the same addresses in the region signal memory unit 2b of the memory unit 2.

In the halftone-dot type selecting circuit 4, one of the 1$^{st}$ to n$^{th}$ kinds of dot signals is selected in accordance with each region signal read out from the memory unit 2. The thus-selected dot signal is then fed to the dot-forming comparator 6, together with one of the color-separated color signals Y through K of a color plate to be recorded, which one of the color-separated color signals is concurrently read out from the memory unit 2.

At the comparator 6, the density level of each picture signal is compared by a known method with the halftone dot signal read out from the corresponding memory 5$_1$–5$_n$ so that the picture signal is output as an exposure control signal. In this manner, a halftone dot of a dot percent corresponding to the picture signal is recorded.

Regarding region signals which are read out from the memory unit 2, those common to all plates are repeatedly read out whenever each color plate is recorded.

If it is desired to change and control the dot shape plate by plate, different code conversion tables may however be provided for individual color plates in the region discriminating circuit 3 so as to permit the control of dot shape plate by plate.

The second embodiment of this invention is now described with reference to FIG. 2, in which desired region signals are obtained by discriminating the density range of desired picture signals or the color hue range of color hues of the three color signals Y, M and C is discriminated by a region discriminating circuit 3 similar to the above-described one immediately after simultaneous reading-out of the individual color-separated color signals Y, M, C and K from the memory unit 2, without storing the region signals in the memory unit 2.

Similar to the first embodiment, the picture signals which are input to the comparator 6 are one kind of color signals out of the color-separated color signals Y, M, C and K corresponding to respective color plates to be recorded.

The third embodiment of this invention is shown in FIG. 3, in which the dot shape is controlled in accordance with the coordinate range of individual picture elements in scanning an original to obtain picture signals or in scanning to record the picture signals.

For example, the coordinate range of the whole image is divided into two regions either vertically or horizontally. Halftone images of different dot shapes are then recorded in the thus-divided regions, respectively.

For the vertical division, the region discriminating circuit 3 sets the region of each of coordinates on each dividing boundary in the main scanning direction. In order to divide horizontally, the region of each coordinate on each dividing boundary in the subscanning direction is set. Each coordinate, the region of which has been set in the above manner, is then compared with the corresponding recording position coordinate signal to obtain a region identification signal. This region identification signal is thereafter converted to a region signal for selecting a dot signal of a desired dot shape for a region divided in the same manner as described above, followed by output of the region signal.

When the coordinate range is divided into regions, it is possible not only to divide a screen vertically or horizontally into two regions but also to perform window designation (see, for example, Japanese Patent Application No. 132987/1984).

By using a mask which is scanned in synchronization and precise registration with an original and is colored in different colors at areas where recording is effected with different dot shapes in registration with the regions of the original, it is also possible to separate individual colors in the course of a scanning operation and to divide the coordinate range of the original in accordance with the thus-separated colors (see, for example, Japanese Patent Publication No. 51262/1972).

When the color scanner to which the present invention is applied is a color scanner permitting layout of a plurality of originals at desired areas, position designating signals obtained from a layout designation unit of the layout scanner to record the reproduced originals may be deemed as region identification numbers for the thus-divided coordinate regions. It is thus possible to convert the position designating signals to region signals so as to designate a desired dot shape original by original.

When the layout scanner can output mask signals by designating the coordinates of each mask (see, for example, Japanese Patent Publication No. 247943/1983 and Japanese Patent Application No. 272003/1984), the mask signals may also be deemed as region identification numbers. By converting the mask signals to region signals, a desired dot shape may be designated both inside and outside the regions of the mask. Needless to say, it is feasible to designate a plurality of mask regions and to change the dot shape from one mask region to another.

In the above embodiments, desired one of the elements of density range, color hue range and coordinate range is divided into plural regions and different dot shapes are used separately in the plural regions. It is also possible to divide desired two of the above elements or all the above elements into plural regions at once, to establish the order of preference with respect to region signals for each element and then to control the dot shape.

In the above description of the present invention, the original is colored and the reproduced material is also colored. The present invention may be equally applied to such a situation that an original is colored and its duplicate is printed in a single color. When an original is not colored, the ranges other than color hue range can be employed to express the original as an image having different kinds of dots.

Having now fully described the invention, it will be apparent to one of ordinary skill in the art that many changes and modifications can be made thereto without departing from the spirit or scope of the invention as set forth herein.

I claim:

1. A printing plate apparatus for reproducing and recording a halftone image by photoelectrically scanning an original in a single scanning pass, said original having density range, hue range and position range, said apparatus comprising:

means for dividing one of the density range, hue range and position range of the original into regions having predetermined widths;

means for outputting region signals corresponding to the regions;

means for selecting one of differing halftone signals of different halftone shapes for each of the regions in accordance with said region signals;

means for generating the differing halftone signals of the different halftone shapes; and signal comparator means for comparing an image signal corresponding to the region of the region signal and the halftone signal selected in accordance with the region signal and outputting an image signal for recording a reproduced image.

2. An apparatus as claimed in claim 1, wherein said apparatus is additionally equipped with a memory unit adapted to store pixel signals in combination with their corresponding region signals.

3. A printing plate method for reproducing and recording a halftone image, comprising:

photoelectrically scanning, in a single pass, an original, having density range, hue range and position range;

having density range, hue range and position range;

dividing the original into pixels;

sectioning any of density range, hue range relating to each of said pixels, and position range on which said pixels locate, into regions having predetermined widths;

outputting region signals corresponding to said regions;

selecting any of a plurality of differing halftone signals of different halftone shapes based on said region signals;

recording a halftone image having said different halftone shapes.

4. The method of claim 3, further comprising comparing an image signal corresponding to said region of said region signal and said halftone signal and outputting an image signal for recording said halftone image.

5. A method as claimed in claim 3, wherein region signals are extracted for each of said pixels obtained by the photoelectric scanning of the original or each of said pixels adapted to record the reproduced image, and picture element signals corresponding to the former or latter picture elements are employed in combination with their corresponding region signals upon suing a memory unit for magnification change of simultaneous recording of said halftone image.

* * * * *